D. HIGHAM.
MECHANISM FOR DRIVING AT UNIFORM SPEEDS.
APPLICATION FILED JUNE 13, 1908.
1,031,339.
Patented July 2, 1912.
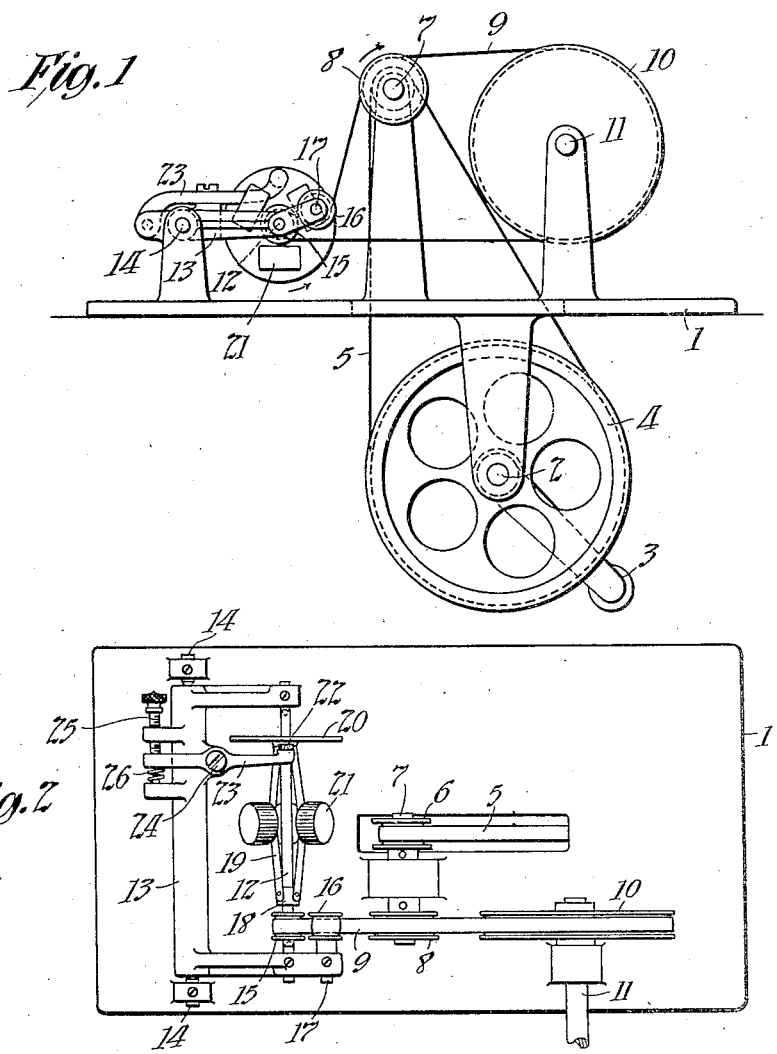
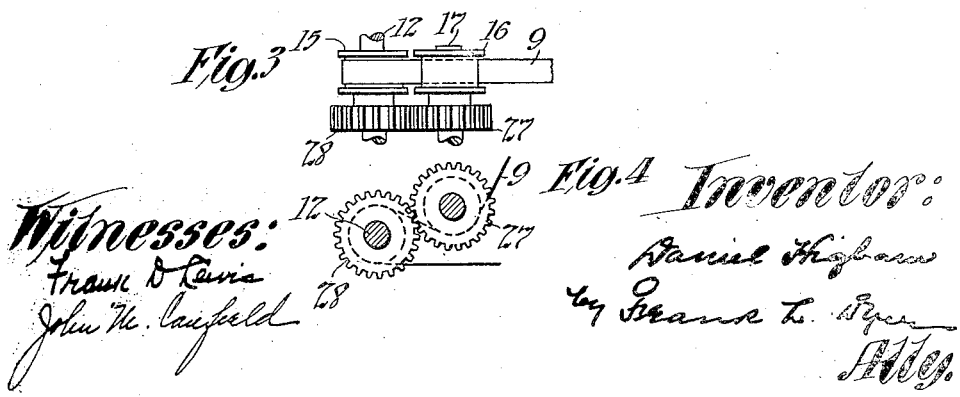

UNITED STATES PATENT OFFICE.

DANIEL HIGHAM, OF EAST ORANGE, NEW JERSEY.

MECHANISM FOR DRIVING AT UNIFORM SPEEDS.

1,031,339. Specification of Letters Patent. Patented July 2, 1912.

Application filed June 13, 1908. Serial No. 438,258.

*To all whom it may concern:*

Be it known that I, DANIEL HIGHAM, a citizen of the United States, and a resident of East Orange, in the county of Essex and State of New Jersey, have invented a certain new and useful Improvement in Mechanism for Driving at Uniform Speeds, of which the following is a description.

My invention relates to driving mechanism for apparatus which requires to be operated at uniform or regular speed, as for instance, talking machines, and moving picture machines operated in connection with talking machines, and has for its object the provision of governing means whereby the said apparatus can be operated at uniform speed from a source of power running at variable or irregular speed, as for instance, a crank shaft, operated by hand, said governing means being interposed between the variable driving mechanism and the apparatus to be operated, so as to automatically control the speed of the latter, and cause the same to be regular and uniform within a wide range of variations of speed in the driving power.

In the accompanying drawing, Figure 1 is a side elevation, showing one form of my invention applied to a driving mechanism operated by a crank shaft. Fig. 2 is a plan view of the same, and Figs. 3 and 4 are respectively a plan and side elevation of a modification of one of the details of the governor.

The drawing shows a base or body 1 upon which is journaled a horizontal shaft 2, provided with a crank 3 adapted to be operated by hand. Upon the shaft 2 is mounted a pulley 4 around which passes a driving belt 5 which also passes over a pulley 6 mounted on a countershaft 7 which is journaled in standards integral with the body 1. The shaft 7 is provided with a driving pulley 8 and a belt 9 passes over the same and around a driven pulley 10 mounted on the shaft 11 which may be the main shaft of a phonograph, moving picture machine, or other device which it is desired to drive at uniform speed. The direction of travel of the belt 9 is indicated by the arrow. The governor shaft 12 is journaled in a frame 13 which is mounted to turn freely on a horizontal axis, or pivot, formed by the centers 14. A pulley 15 is mounted on the shaft 12 and the belt 9 passes around the same as shown. There is an idler 16 rotatably mounted on the pin 17 carried by the frame 13 and so arranged as to increase the extent of contact of the belt 9 upon the pulley 15. Upon the governor shaft 12 is a fixed sleeve 18, to which are secured the ends of flat springs 19 the opposite ends of which are secured to a slidable sleeve formed with a friction disk or flange, 20, weights 21 being secured to the central portions of said springs. A friction pad 22, of felt or other suitable material, is mounted on one end of the lever 23 which is pivoted on the screw 24 threaded in the frame 13. The position of the pad 22 may be adjusted by the screw 25 threaded in the frame 13, and bearing against the rear end of the lever 23, a spring 26 being provided for holding the lever against the end of the screw 25.

In Figs. 3 and 4 is illustrated a modification in which the idler 16 is geared to the shaft 12 by means of spur gears 27 and 28, which arrangement further increases the extent of driving contact of the belt 9 with respect to the shaft 12.

The operation of the device is as follows: Power being applied to the crank 3 the shaft 2 is driven at a somewhat variable speed which is transmitted to the shaft 7 by the belt 5. The pulley 8 rotating with the shaft 7 serves to drive the belt 9, in the direction of the arrow and thereby impart rotation to the shaft 11 and the governor shaft 12. The idler 16, which, it will be noted, engages that portion of the belt which is under driving tension due to the load upon the shaft 11, is held against the belt 9 by reason of the weight of the frame 13 and parts carried thereby, the center of gravity of which is, of course, at the right of the centers 14 in Figs. 1 and 2. The rotation of the governor shaft 12, at normal speed by centrifugal action, moves the disk 20 into contact with the friction pad 22. Whenever the speed of the shafts 2 and 7 increases beyond normal, the speed of the belt 9 and shaft 12 increases, thus causing an increase of pressure between the disk 20 and pad 22, which, of course, increases the load or tension on the belt 9, and on account of the position of the idler 16, the said increase of tension raises the frame 13, which turns on its centers 14. This movement of the idler 16 away from the belt is equivalent to lengthening the belt, or loosening it, with respect to the driving pulley 8, so that the belt slips and its increase of speed is automatically checked.

Whenever the speed of the shafts 2 and 7 falls below normal, the speed of the governor shaft 12 falls, thereby diminishing the pressure of the disk 20 on the body 22, and lessening the tension or load on the belt 9, whereupon the frame 13 moves downward, and the idler 16 shortens up or tightens the belt with respect to the pulley 8, thereby preventing the slipping of the belt. In this manner the governor automatically compensates for variations in speed of the shaft 2, and causes the shaft 11 to be driven at a substantially uniform speed, although the shaft 2 be driven at a variable speed. While I prefer to use an idler 16, as described, the same may be dispensed with, since the pulley 15 alone will act as a belt tightener, which will loosen the belt when the load on the shaft 12 increases, and thereby cause the belt to slip on the pulley 8, and vice versa, it will tighten the belt when the load on the shaft 12 decreases.

Having now described my invention, what I claim is:

1. In a driving mechanism, the combination of the driving and driven pulley, a belt passing around the same, a speed governor driven by that portion of the belt passing from the driven to the driving pulley, and means pressing against said portion of the belt for tightening the belt as the speed of said governor decreases and for loosening the same as the governor speed increases.

2. In a driving mechanism, the combination of the driving and driven pulley, a belt passing over the same, a device pressing against that portion of the belt which passes from the driven to the driving pulley, and means driven by said belt, for varying the pressure of said device on said belt to vary the tightness of the latter in accordance with but inversely to variations in the speed thereof.

3. In a driving mechanism, the combination of the driving and driven pulley, a belt passing over the same, and means which automatically tightens said belt as the speed decreases, and loosens said belt as its speed increases.

4. In a driving mechanism, the combination of the driving and driven pulley, a belt passing over the same, a third pulley pressing against said belt, and means for varying the pressure of said belt against said driving pulley, in accordance with but inversely to variations in the speed of the belt.

5. In a driving mechanism, the combination of a driving and driven pulley, a belt passing over the same, a speed governor mounted in a movable frame and driven by said belt, the movement of said frame serving to tighten or loosen the belt to compensate for variations in the speed thereof.

6. In a driving mechanism, the combination of a driving and driven pulley, a belt passing over the same, a speed governor mounted in a pivotal frame, and driven by said belt, the pivotal movement of said frame serving to tighten or loosen the belt to compensate for variations in the speed thereof.

7. In a driving mechanism, the combination of the driving and driven pulley, a belt passing over the same, and means for automatically deflecting said belt to vary the pressure thereof upon the driving pulley, in accordance with but inversely to variations in the speed of the belt.

This specification signed and witnessed this 12 day of June 1908.

DANIEL HIGHAM.

Witnesses:
 FRANK D. LEWIS,
 JOHN M. CANFIELD.